(12) United States Patent
Ni et al.

(10) Patent No.: US 12,056,910 B2
(45) Date of Patent: Aug. 6, 2024

(54) METHOD AND SYSTEM OF EVALUATING THE VALID ANALYSIS REGION OF A SPECIFIC SCENE

(71) Applicant: GORILLA TECHNOLOGY INC., Taipei (TW)

(72) Inventors: Sze-Yao Ni, Taipei (TW); Kuo-Chen Wu, Taipei (TW); Wen-Yueh Chiu, Taipei (TW)

(73) Assignee: GORILLA TECHNOLOGY UK LIMITED, Middlesex (GB)

( * ) Notice: Subject to any disclaimer, the term of this patent is extended or adjusted under 35 U.S.C. 154(b) by 38 days.

(21) Appl. No.: 16/732,344

(22) Filed: Jan. 1, 2020

(65) Prior Publication Data

US 2021/0142481 A1 May 13, 2021

(30) Foreign Application Priority Data

Nov. 8, 2019 (TW) .................. 108140699

(51) Int. Cl.
| | |
|---|---|
| *G06K 9/00* | (2022.01) |
| *G06T 7/11* | (2017.01) |
| *G06T 7/20* | (2017.01) |
| *G06V 10/25* | (2022.01) |
| *G06V 10/776* | (2022.01) |
| *G06V 20/52* | (2022.01) |

(52) U.S. Cl.
CPC ............. *G06V 10/25* (2022.01); *G06T 7/11* (2017.01); *G06T 7/20* (2013.01); *G06V 10/776* (2022.01); *G06V 20/52* (2022.01); *G06T 2207/10016* (2013.01); *G06T 2207/30196* (2013.01); *G06T 2207/30248* (2013.01)

(58) Field of Classification Search
CPC ............................................ G06T 2207/10016
See application file for complete search history.

(56) References Cited

U.S. PATENT DOCUMENTS

| | | | | |
|---|---|---|---|---|
| 7,813,549 | B2* | 10/2010 | Buelow | G06T 7/11 382/173 |
| 8,306,267 | B1* | 11/2012 | Gossweiler, III | G06K 9/00261 382/103 |
| 9,292,103 | B2* | 3/2016 | Burr | G06F 3/0304 |
| 2002/0196962 | A1* | 12/2002 | Fukuhara | G08B 13/1963 382/103 |
| 2004/0252194 | A1* | 12/2004 | Lin | H04N 7/181 348/E7.086 |

(Continued)

OTHER PUBLICATIONS

X. Chen, J. Xu and Z. Yu, "A fast and energy efficient FPGA-based system for real-time object tracking," 2017 Asia-Pacific Signal and Information Processing Association Annual Summit and Conference (APSIPA ASC), 2017, pp. 965-968, doi: 10.1109/APSIPA. 2017.8282162. (Year: 2017).*

*Primary Examiner* — Hadi Akhavannik
(74) *Attorney, Agent, or Firm* — Min-Lee Teng

(57) ABSTRACT

A method and system of evaluating a valid analysis region of a specific scene, wherein the method and system performs image analyses on continuous images/frames of a specific scene to obtain detectable object or event information therein, so as to generate a closed valid analysis region to reduce the overall data and loading of image analyses during actual monitoring, processing and analyzing of the specific scene.

15 Claims, 8 Drawing Sheets

(56) References Cited

U.S. PATENT DOCUMENTS

| | | | |
|---|---|---|---|
| 2005/0116838 A1* | 6/2005 | Bachelder | G08G 1/087 348/148 |
| 2005/0276462 A1* | 12/2005 | Silver | H04N 5/772 382/141 |
| 2009/0041295 A1* | 2/2009 | Matsuzaka | H04N 5/232939 382/100 |
| 2009/0060271 A1* | 3/2009 | Kim | H04N 7/181 382/103 |
| 2010/0231504 A1* | 9/2010 | Bloem | G06F 3/013 345/156 |
| 2011/0050899 A1* | 3/2011 | Merkel | G08B 13/19606 348/143 |
| 2011/0135151 A1* | 6/2011 | Jang | H04N 19/20 382/103 |
| 2012/0026308 A1* | 2/2012 | Johnson | G06T 7/73 348/77 |
| 2013/0287259 A1* | 10/2013 | Ishii | G06T 7/11 382/103 |
| 2015/0085128 A1* | 3/2015 | Pineau | G08B 13/19645 348/150 |
| 2015/0213299 A1* | 7/2015 | Solano | G06T 7/0008 382/103 |
| 2016/0026865 A1* | 1/2016 | Reynolds, Jr. | G06T 7/593 382/103 |
| 2016/0321506 A1* | 11/2016 | Fridental | H04N 21/4788 |
| 2017/0213345 A1* | 7/2017 | Eslami | G06T 7/136 |
| 2018/0075190 A1* | 3/2018 | Ootsuki | A61B 3/12 |
| 2018/0174414 A1* | 6/2018 | Edpalm | H04L 63/16 |
| 2018/0232592 A1* | 8/2018 | Stewart | G08B 13/19606 |
| 2019/0258885 A1* | 8/2019 | Piette | G06K 9/6267 |
| 2019/0277959 A1* | 9/2019 | Tartaro | G08B 13/2491 |

\* cited by examiner

METHOD AND SYSTEM OF EVALUATING THE VALID ANALYSIS REGION OF A SPECIFIC SCENE

CROSS-REFERENCES TO RELATED APPLICATIONS

This application claims the priority of Taiwanese application No. 108140699 filed Nov. 8, 2019, the disclosure of which is incorporated herein in its entirety by reference.

BACKGROUND OF THE INVENTION

I. Field of the Invention

The present invention relates to a method for evaluating a valid analysis region, and more particularly to a method for evaluating a valid analysis region of a specific scene.

II. Description of Related Art

In recent years, with the increase in the number of surveillance cameras, the applications for image analyses have also increased rapidly, such as human form detection, vehicle detection, background detection, and abnormal behavior analysis, etc. However, onsite personnel often lacks sufficient tools, experience or professional knowledge to define a valid analysis region in a specific scene based on an image analysis technology, as a result, it is difficult to verify whether the images of the specific scene meet the analysis requirements. Conventionally, the setting of the valid analysis region relies upon the experience of the onsite personnel along with the repeated trial-and-error, which not only requires lots of manpower but also cannot guarantee that a correct valid analysis region can be obtained.

Therefore, the industry needs a new method to evaluate a valid analysis region of a specific scene based on an image analysis technology.

SUMMARY OF THE INVENTION

One objective of the present invention is to provide a method to evaluate a valid analysis region of a specific scene so as to reduce the loading of the image analyses during actual monitoring of the specific scene.

Another objective of the present invention is to provide a method to evaluate a valid analysis region of a specific scene so as to assist onsite personnel to configure a detection condition for monitoring the specific scene.

In one embodiment of the present invention, a method for evaluating a valid analysis region of a specific scene is disclosed, wherein the method comprises extracting a plurality of continuous images of the specific scene within a specified time interval; performing image analyses on the plurality of continuous images to obtain detectable objects or event information therein; and generating a closed valid analysis region based on the detectable objects or event information so as to reduce the loading of the image analyses during actual monitoring of the specific scene. Please note that said images can be derived from many different image sources such as interlaced frames, compressed frames, and etc.

In one embodiment, the method further comprises displaying the closed valid analysis region on a monitor to assist a user to configure a detection condition for monitoring the specific scene.

In one embodiment, the method further comprises automatically configuring a detection condition for monitoring the specific scene.

In one embodiment, the detection condition is a line segment in the closed valid analysis region.

In one embodiment, the detection condition is a sub-sub-region of the closed valid analysis region.

In one embodiment, the objects comprise a person.

In one embodiment, the objects or event information comprises the position, size, time-stamp or tracked motion paths of a person.

In one embodiment, the objects comprise a vehicle.

In one embodiment, the objects or event information comprises the position, size, time-stamp or tracked motion paths of a vehicle.

In one embodiment, the method further comprises distinguishing the objects or event information obtained from analyzing the images of the specific scene in different time intervals, so as to obtain different valid analysis regions of the specific scene in said different time intervals, respectively.

In one embodiment, the method further comprises distinguishing and respectively connecting the objects or event information obtained from analyzing the images of the specific scene in different levels of brightness, so as to obtain different valid analysis regions of the specific scene in said different levels of brightness, respectively.

In one embodiment, the method further comprises assisting a user in selecting different detection technologies.

In one embodiment of the present invention, a system for evaluating a valid analysis region of a specific scene is disclosed, wherein the method comprises: an extracting module, for extracting a plurality of continuous images of a specific scene within a time interval; an analysis module, for performing image analyses on the plurality of continuous images to obtain detectable objects or event information therein; and a learning module, for generating a closed valid analysis region according to the detectable objects or event information, so as to reduce the overall data and loading of the image analyses during actual monitoring of the specific scene.

In one embodiment, the system further comprises a configuring module for displaying the closed valid analysis region on a monitor to assist a user to configure a detection condition for monitoring the specific scene.

In one embodiment, the system automatically configures a detection condition for monitoring the specific scene.

In one embodiment, the detection condition is a line segment in the closed valid analysis region.

In one embodiment, the detection condition is a sub-sub-region of the closed valid analysis region.

In one embodiment, the objects comprise a person.

In one embodiment, the objects or event information comprises the position, size, time-stamp or tracked motion paths of a person.

In one embodiment, the objects comprise a vehicle.

In one embodiment, the objects or event information comprise the position, size, time-stamp or tracked motion paths of a vehicle.

In one embodiment, the learning module further comprises distinguishing objects or event information obtained from analyzing the specific scene in different time intervals, so as to obtain different valid analysis regions of the specific scene in said different time intervals, respectively.

In one embodiment, the system further comprises assisting a user to select different detection technologies.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention.

DESCRIPTION OF EMBODIMENTS

The foregoing, as well as other technical contents, features, and effects of the present invention, will be clearly apparent from the following detailed description with reference to the preferred embodiments of the drawings. However, it should be noted that the following embodiments are not intended to limit the present invention.

Depending on the viewing angle, image quality, viewing depth and screen distortion of a particular scene, the valid analysis regions of different scenes based on the same image analysis technology may be different. It is very important to configure a correct valid analysis region so that the following advantages can be obtained: (1) the accuracy of the image analyses can be improved significantly by excluding regions in which image analyses are not needed; (2) the speed of the image analyses can also be improved significantly by excluding regions in which image analyses are not needed.

Figure 1:
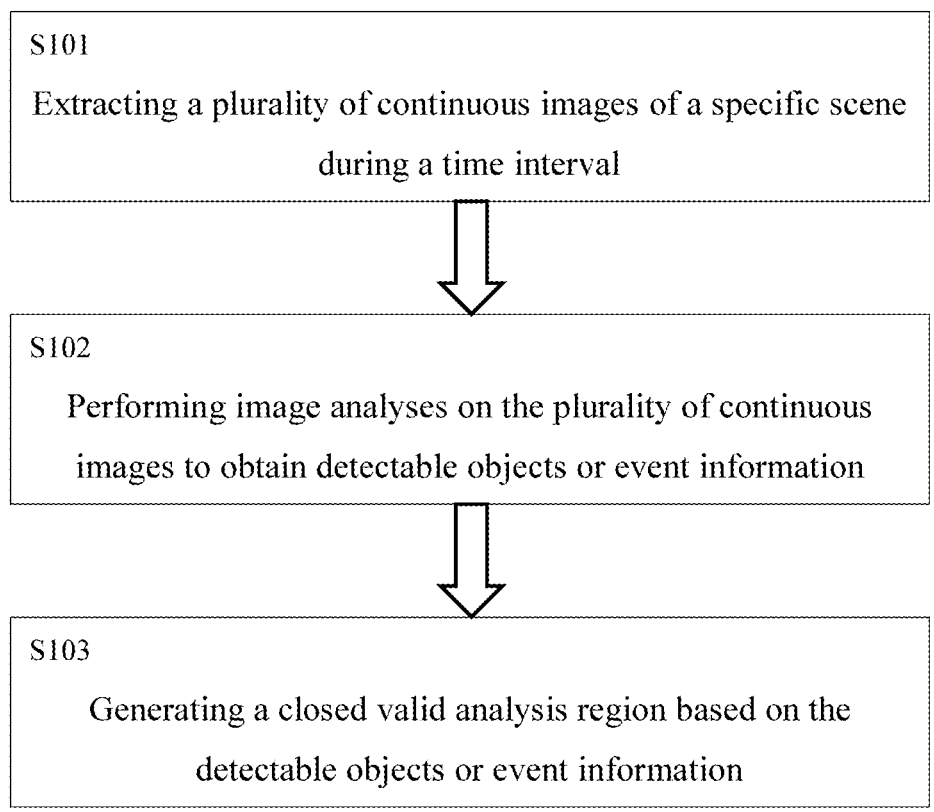
FIG. 1 illustrates a flowchart of a method for evaluating a valid analysis region of a specific scene in accordance with one embodiment of the present invention.

FIG. 1 illustrates a flowchart of a method for evaluating a valid analysis region of a specific scene in accordance with one embodiment of the present invention, wherein the method comprises: step S101: extracting a plurality of continuous images of a specific scene during a time interval; step S102: performing image analyses on the plurality of continuous images to obtain detectable objects or event information therein; step S103: generating a closed valid analysis region based on the detectable objects or event information, so as to reduce the loading of the image analyses during actual monitoring of the specific scene, wherein the image analyses outside the closed valid analysis region are not performed during actual monitoring of the specific scene.

In one embodiment, the objects comprise a person.

In one embodiment, the objects or event information comprises the position, size, time-stamp or tracked motion paths of a person.

In one embodiment, the objects comprise a vehicle.

In one embodiment, the objects or event information comprises the position, size, time-stamp or tracked motion paths of a vehicle.

In one embodiment, one of the objects is a specific type of person.

In one embodiment, one of the objects is a specific type of vehicle.

In one embodiment, one of the objects is a ship, aircraft, machine, etc.

In one embodiment, one of the objects is an animal (livestock, pet, insect, etc.)

In one embodiment, one of the objects is a natural phenomenon or pathological phenomenon, etc.

In one embodiment, the method further comprises displaying the closed valid analysis region on a monitor to assist a user to configure a detection condition for monitoring the specific scene.

In one embodiment, the method further comprises automatically configuring a detection condition for monitoring the specific scene.

In one embodiment, the detection condition is a line segment in the closed valid analysis region.

In one embodiment, the detection condition is a sub-region of the closed valid analysis regions.

In one embodiment, the method further comprises assisting a user in selecting different detection technologies, for example, a detection technology A has a larger valid analysis region for motorcycles but a smaller valid analysis region for cars, and vice versa for a detection technology B, wherein a user can select a corresponding detection technology A or B for detecting motorcycles or cars.

In one embodiment, the method further comprises distinguishing the objects or event information obtained from analyzing the specific scene in different time intervals, so as to obtain different valid analysis regions of the specific scene in said different time intervals, respectively.

In one embodiment, the method further comprises distinguishing and respectively connecting the objects or event information obtained from analyzing the specific scene in different levels of brightness so as to obtain different valid analysis regions of the specific scene corresponding to said different levels of brightness, respectively.

Figure 2:
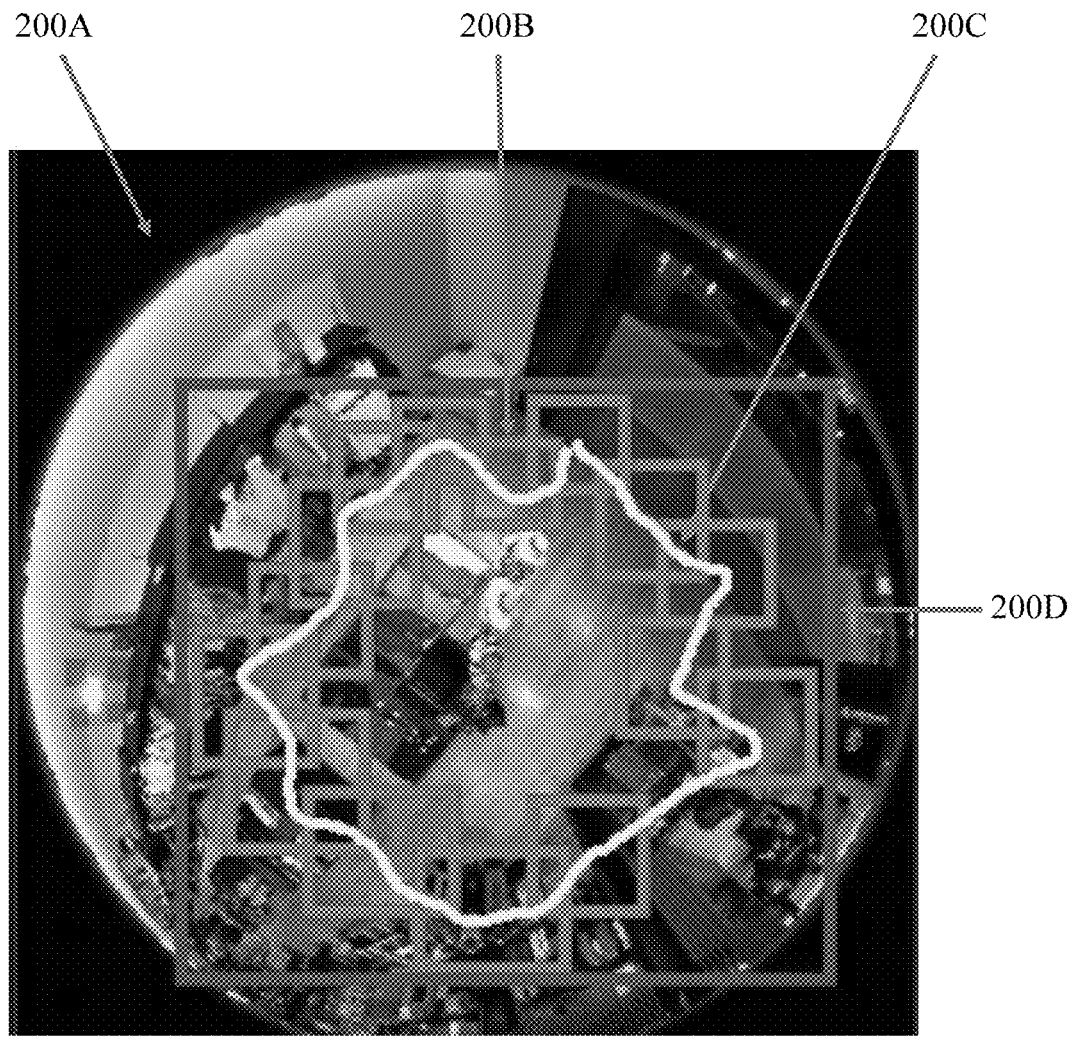
FIG. 2 illustrates a graphic example of the method for evaluating a valid analysis region of a specific scene in accordance with one embodiment of the present invention.

FIG. 2 illustrates a method for evaluating a valid analysis region of a specific scene according to one embodiment of the present invention. Please refer to FIG. 2 and FIG. 4. In this embodiment, detection of persons is performed on a plurality of continuous images/frames captured by a camera with a fisheye lens for monitoring a specific scene, and the detection results are transmitted to the learning module so as to obtain the following analysis results:

Continuous images of a specific scene 100: obtained from the camera monitoring the specific scene, such as a store or supermarket 200A.

Extracting Module 101: extract a plurality of continuous images during a time interval.

Analysis Module 102: performing image analyses on the plurality of continuous images of the store or supermarket 200A to obtain detectable objects or event information therein. In one embodiment, the analysis module 102 can use an object detector based on a SSD (Single Shot Multi-Box Detector) of a deep-learning network for the detection of persons.

Learning Module 103: frame 200B in FIG. 2 represents a region where analysis information is extracted; the region 200C in FIG. 2 represents a valid analysis region generated by the analysis information; frame 200D in FIG. 2 represents the boundary frame of the valid analysis region.

The analysis module 102 and the learning module 103 can be located in the same device or in different devices. In one embodiment, a plurality of analysis modules with different detection technologies or different deep-learning network models can be used to detect objects and to provide detection results to the learning module. The learning module can compare the analysis results to generate the valid analysis regions and the boundary frame thereof, wherein detection technology or the deep-earning network model with the best detection rate or the best detection range can be automatically selected. In order to detect a specific type or size of objects or event information, the learning module can only process the objects or event information of the specific type or size, so as to generate a valid analysis region and the boundary frame thereof.

Figure 3:
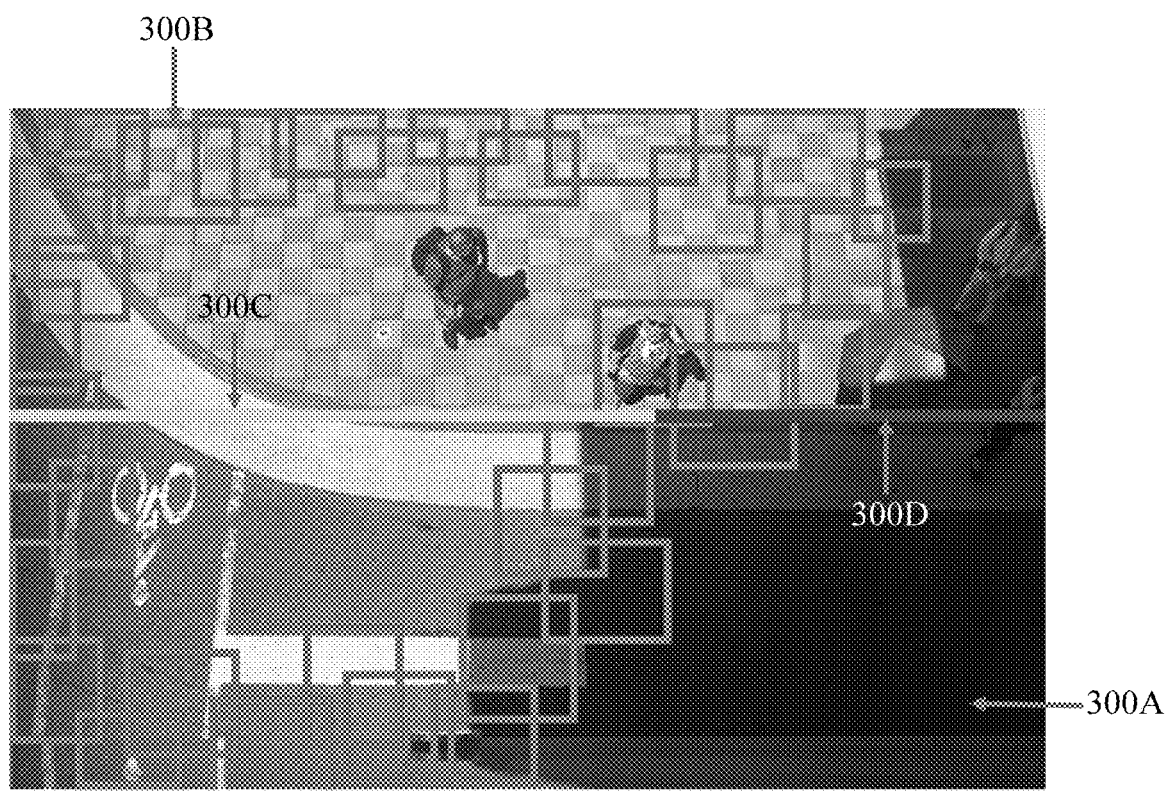
FIG. 3 illustrates another graphic example of the method for evaluating a valid analysis region of a specific scene in accordance with another embodiment of the present invention.

FIG. 3 illustrates a method for evaluating a valid analysis region of a specific scene according to one embodiment of the present invention. Different time intervals and different weather and other factors will cause some differences in light and shadow as well as levels of brightness of the environment, as a result, detection rates can be affected, for example, objects in dark regions may not be effectively detected. The learning module can further distinguish and respectively connect the objects or event information obtained from analyzing the specific scene in different levels of brightness or different time intervals, so as to obtain different valid analysis regions of the specific scene corresponding to the different levels of brightness and the different time intervals, respectively. The obtained valid analysis regions can be used as a default ROI (Region of Interest, where the image analyses are actually performed) of the monitoring device for monitoring the specific scene in different levels of brightness and time intervals, or different ROI or line segments for monitoring the specific scene in different levels of brightness or time intervals can be configured by a user as well.

300A in FIG. 3 represents a specific scene; frame 300B in FIG. 3 represents the region where analysis information is extracted; line segment 300C in FIG. 3 represents the valid detection line segment in this level of brightness or time interval; line segment 300D in FIG. 3 represents the invalid detection line segment in this level of brightness or time interval.

Since there may be some unexpected objects or events in certain specific regions, such as humanoid models or standing figures that may be easily detected as human objects, in addition, the shape of certain specific objects is likely to cause false detection as well, the learning module can distinguish the unexpected objects or events by the time of occurrence, tracked motion paths, and size of the object, so as to exclude them from the valid analysis region.

Figure 4:
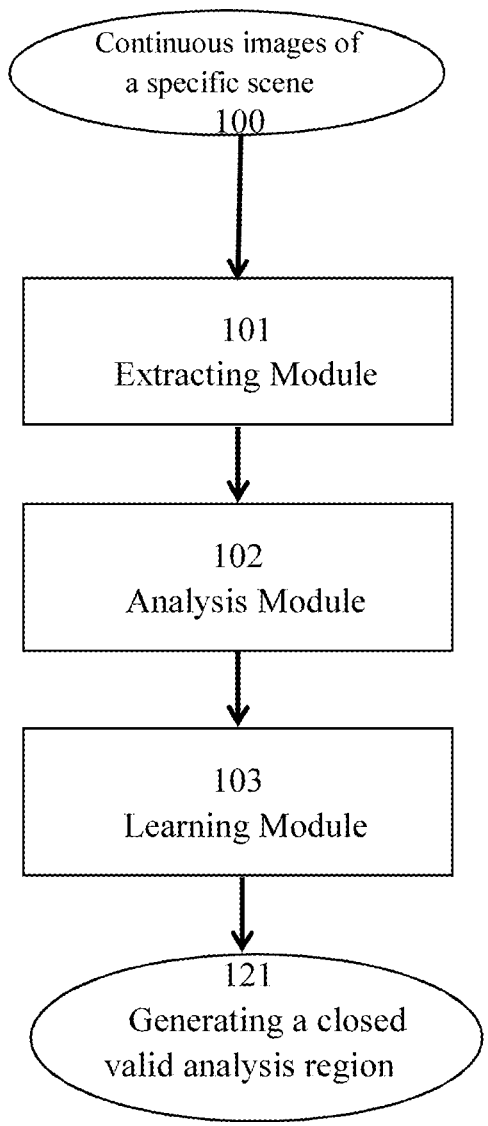
FIG. 4 illustrates a schematic diagram of a system for evaluating a valid analysis region of a specific scene in accordance with one embodiment of the present invention.

FIG. 4 illustrates a schematic diagram of a system for evaluating a valid analysis region of a specific scene in accordance with one embodiment of the present invention. The system comprises: an extracting module 101, for extracting a plurality of continuous images 100 within a time interval in a specific scene; an analysis module 102, for performing image analyses on the plurality of continuous images to obtain detectable objects or event information therein; and a learning module 103, for generating a closed valid analysis region 121 according to the detectable object or event information, so as to reduce the loading of the image analyses during actual monitoring of the specific scene.

In one embodiment, the analysis module and learning module are located in the same device.

In one embodiment, the analysis module and learning module are located in different devices.

In one embodiment, the system further comprises displaying the closed valid analysis region on a monitor to assist a user to configure a detection condition for monitoring the specific scene.

In one embodiment, the system further comprises automatically configuring a detection condition for monitoring the specific scene.

In one embodiment, the detection condition is a line segment in the closed valid analysis region.

In one embodiment, the detection condition is a sub-region of the closed valid analysis regions.

In one embodiment, the system further comprises assisting a user in selecting different detection technologies. For example, detection technology A has a larger valid analysis region for motorcycles but a smaller valid analysis region for cars, and vice versa for detection technology B, a user can select a corresponding detection technology A or B for detecting motorcycles or cars.

In one embodiment, the objects comprise a person.

In one embodiment, the objects or event information comprises the position, size, time-stamp or tracked motion paths of a person.

In one embodiment, the objects comprise a vehicle.

In one embodiment, the objects or event information comprises the position, size, time-stamp or tracked motion paths of a vehicle.

In one embodiment, the objects comprise a specific type of person or vehicle.

In one embodiment, the objects comprise a ship, aircraft, machine, etc.

In one embodiment, the objects comprise an animal—(livestock, pet, insect, etc.)

In one embodiment, the objects comprise a natural phenomenon or pathological phenomenon, etc.

In one embodiment, the learning module further comprises a distinguishing object or event information obtained from analyzing the specific scene in different time intervals, so as to obtain different valid analysis regions of the specific scene in said different time intervals, respectively.

In one embodiment, the learning module further comprises distinguishing and respectively connecting the objects or event information obtained from analyzing the specific scene in different levels of brightness, so as to obtain different valid analysis regions of the specific scene in said different levels of brightness, respectively.

Figure 5:
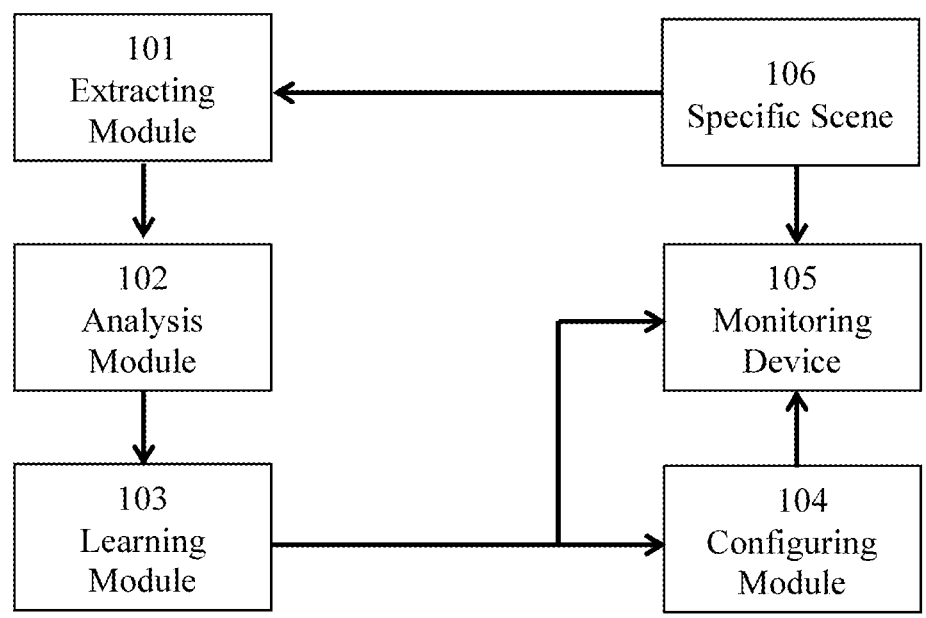
FIG. 5 illustrates a schematic diagram of a system for evaluating a valid analysis region of a specific scene in accordance with another embodiment of the present invention.

FIG. 5 illustrates a schematic diagram of a system for evaluating a valid analysis region of a specific scene in accordance with another embodiment of the present invention. The system comprises: an extracting module 101, for extracting a plurality of continuous images within a time interval in a specific scene 106; an analysis module 102, for performing image analyses on the plurality of continuous images to obtain detectable objects or event information therein; a learning module 103, for generating a closed valid analysis region according to the detectable object or event information, so as to reduce the loading of the image analyses of the monitoring device 105 during actual monitoring of the specific scene; and a configuring module 104, for displaying the closed valid analysis region on a monitor to assist a user to configure a detection condition for monitoring the specific scene.

The analysis module 102, learning module 103 and configuring module 104 may be located in the same device or different devices.

Figure 6:
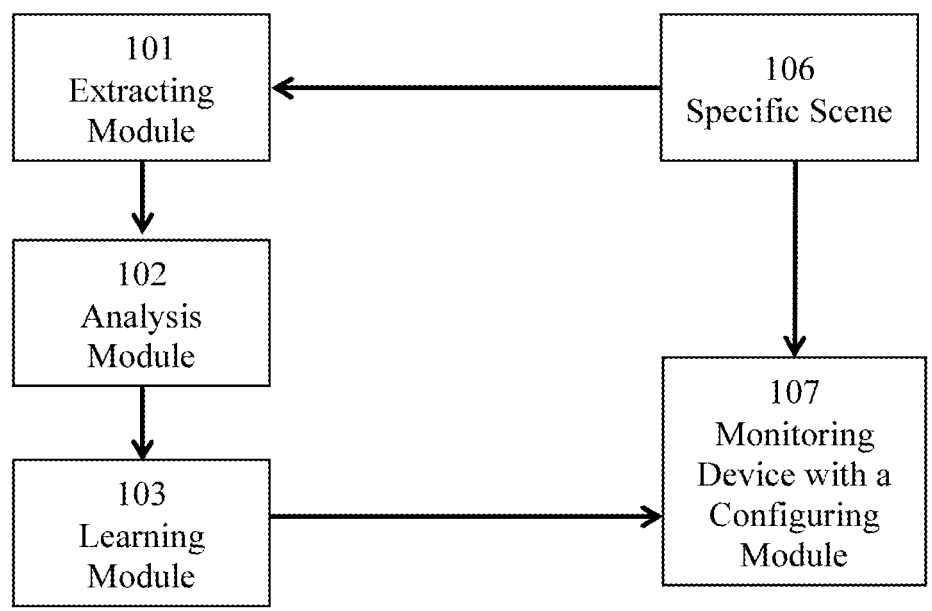
FIG. 6 illustrates a schematic diagram of a system for evaluating a valid analysis region of a specific scene in accordance with another embodiment of the present invention.

As shown in FIG. 6, the configuring module 104 may be located in a monitoring device 107 that is actually monitoring the specific scene.

The plurality of continuous images of a specific scene that is being actually monitored are obtained within a time interval, and the objects can move during the performing of the image analyses. For example, if the scene is a road intersection and the target objects are vehicles, then the detection process will detect various types of vehicles that appear at various locations at the road intersection. The plurality of continuous images of the specific scene can be a live video or a pre-recorded video, wherein the plurality of the continuous images can be a video segment with a defined limited time or a continuous video for analyzing and learning.

Figure 7:
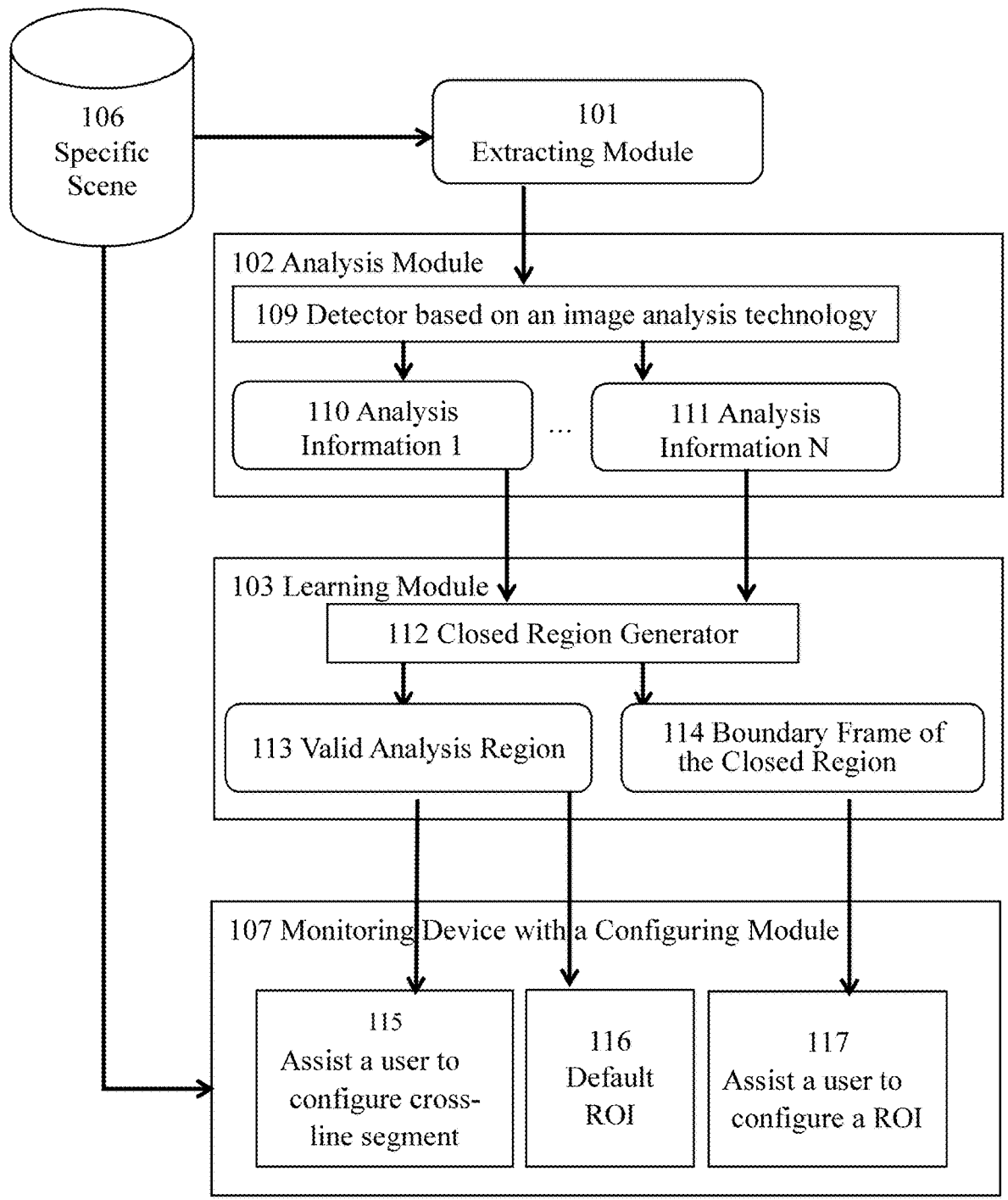
FIG. 7 illustrates a schematic diagram of a system for evaluating a valid analysis region of a specific scene in accordance with another embodiment of the present invention.

FIG. 7 illustrates a schematic diagram of a system for evaluating a valid analysis region of a specific scene in accordance with another embodiment of the present invention. The system comprises: an extracting module 101, for extracting a plurality of continuous images within a time interval in a specific scene 106; an analysis module 102, for performing image analyses on the plurality of continuous images to obtain detectable objects or event information therein; a learning module 103, for generating a closed valid analysis region according to the detectable object or event information, so as to reduce the loading of the image analyses during actual monitoring of the specific scene; and a monitoring device 107 with a configuring module, for displaying the closed valid analysis region on a monitor and assisting a user to configure a detection condition for monitoring the specific scene.

The analysis module 102 and learning module 103 may be located in the same device or different devices.

The analysis module can use a detector 109 based on an image analysis technology to detect different types 110, 111 of objects and event information. The detector 109 of the analysis module can detect and export detectable objects or event information, including types of the objects, position of the objects, size of the objects, time-stamp of the objects or tracked motion paths of the objects.

The learning module 103 obtains the objects or event information from the analysis results. The positions of the objects or event information obtained from the analysis results are connected to generate a closed region 112, which is referred to as a valid analysis region 113, and a boundary frame 114 of the closed region 112 is obtained. The learning module 103 can use all objects or event information in the specific scene, or a specific type or size of the objects or event information in the specific scene. The boundary frame 114 of the closed region 112 can be used as the default ROI 116 (region of interest, the region where analysis is actually performed) by the monitoring device 105, 107; alternatively, the learning module 103 can assist a user to configure a ROI 117 or a cross-line segment 115 by displaying the valid analysis region 113 on a monitor. If the ROI drawn by the user is outside of the boundary frame 114 of the closed region 112, then the system can issue a warning; and if the detection line drawn by the user is outside of the boundary frame 114 of the closed region 112, then the system can also issue a warning.

Figure 8:
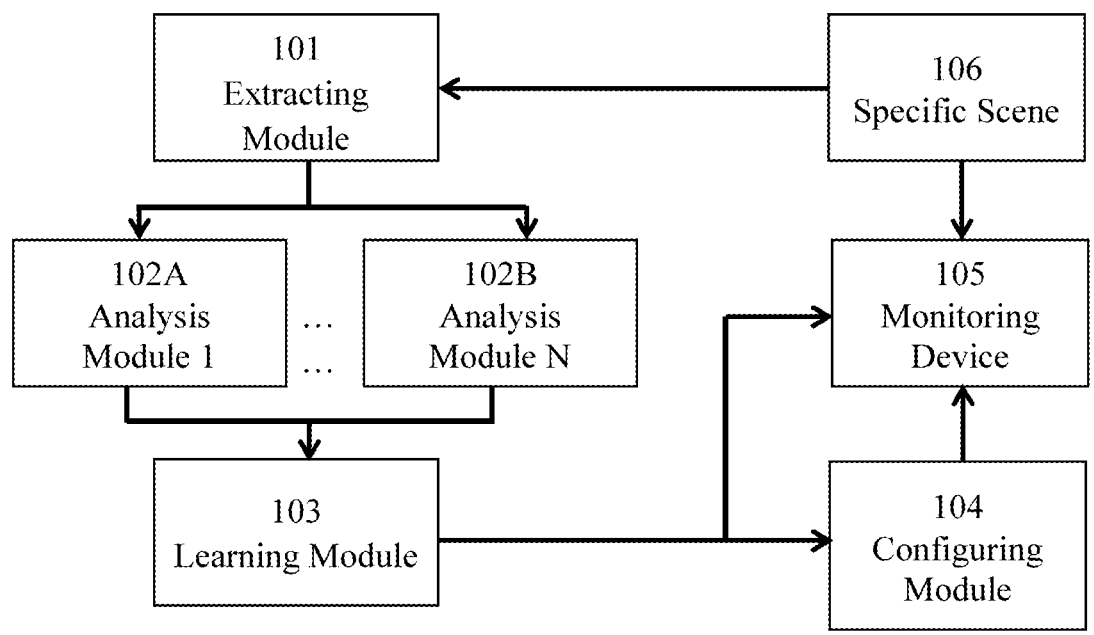
FIG. 8 illustrates a schematic diagram of a system for evaluating a valid analysis region of a specific scene in accordance with another embodiment of the present invention.

FIG. 8 illustrates a schematic diagram of a system for evaluating a valid analysis region of a specific scene in accordance with another embodiment of the present invention. The system comprises: an extracting module 101, for extracting a plurality of continuous images within a time interval in a specific scene; a plurality of analysis modules 102A and 102B, for performing image analyses on the plurality of continuous images to obtain detectable objects or event information therein; a learning module 103, for generating a closed valid analysis region according to the detectable object or event information, so as to reduce the loading of the image analyses during actual monitoring of the specific scene; and a configuring module 104, for displaying the closed valid analysis region on a monitor to assist a user to configure a detection condition for monitoring the specific scene. The analysis modules 102A and 102B, learning module 103 and configuring module 104 can be located in the same device or different devices.

While the invention has been described in connection with the preferred embodiments, it is not intended to limit the scope of the invention. Any person skilled in the art can make some changes and modifications without departing from the spirit and scope of the present invention. The scope of the patent protection of the invention hence shall be subject to the definition of the scope of the patent application attached hereto.

What is claimed is:

1. A method for evaluating the valid analysis region of a specific scene, comprising:
   extracting a plurality of continuous images in a specific scene during a time interval;
   performing image analyses on the plurality of continuous images to obtain detectable objects in the plurality of continuous images/frames;
   generating a static and closed valid analysis region based on a first plurality of different objects of said detectable objects obtained by said image analyses on the plurality of continuous images with the boundary of the static and closed valid analysis region being not formed by the boundary of any object of the first plurality of different objects, wherein said first plurality of different objects are located entirely inside the static and closed valid analysis region, wherein said static and closed valid analysis region is not set through a user's selection and is not changing for tracking a particular object; and
   performing real-time monitoring of the static and closed valid analysis region that is not changing for tracking a particular object, wherein image analyses are performed to obtain a second object that is being monitored with the second object being present inside the static and closed valid analysis region after the static and closed valid analysis region is generated, and the image analyses outside the static and closed valid analysis region are not performed during the real-time monitoring of the static and closed valid analysis region.

2. The method according to claim 1, further comprises displaying the static and closed valid analysis region on a monitor to assist a user to configure a detection condition for monitoring the static and closed valid analysis region.

3. The method according to claim 2, wherein the detection condition is a line segment in the static and closed valid analysis region.

4. The method according to claim 2, wherein the detection condition is a sub-region of the static and closed valid analysis region.

5. The method according to claim 1, wherein the first plurality of different objects comprise a person or a vehicle.

6. The method according to claim 1, further comprises distinguishing the objects obtained from analyzing the specific scene in different time intervals, so as to obtain different valid analysis regions of the specific scene in different time intervals, respectively.

7. The method according to claim 1, further comprises distinguishing and respectively connecting the objects obtained from analyzing the specific scene in different levels of brightness, so as to obtain different valid analysis regions of the specific scene corresponding to different levels of brightness respectively.

8. The method according to claim 1, further comprises automatically configuring a detection condition for monitoring the static and closed valid analysis region.

9. The method according to claim 1, further comprises assisting a user in selecting different detection technologies.

10. A system for evaluating the valid analysis region of an image, comprising:
- an extracting module, for extracting a plurality of continuous images within a time interval in a specific scene;
- an analysis module, for performing image analyses on the plurality of continuous images to obtain detectable objects therein;
- a learning module, for generating a static and closed valid analysis region according to a first plurality of different objects of the detectable objects obtained by said image analyses on the plurality of continuous images with the boundary of the static and closed valid analysis region being not formed by the boundary of any object of the first plurality of different objects, wherein said first plurality of different objects are located entirely inside the static and closed valid analysis region, wherein said static and closed valid analysis region is not set through a user's selection and is not changing for tracking a particular object; and
- a configuring module for displaying the static and closed valid analysis region on a monitor to assist a user to configure a detection condition for real-time monitoring of the static and closed valid analysis region that is not changing for tracking a particular object, wherein image analyses are performed to obtain a second object that is being monitored with the second object being present inside the static and closed valid analysis region after the static and closed valid analysis region is generated, and the image analyses outside the static and closed valid analysis region are not performed during the real-time monitoring of the static and closed valid analysis region.

11. The system according to claim 10, wherein the detection condition is a line segment in the static and closed valid analysis region.

12. The system according to claim 10, wherein the detection condition is a sub-region of the static and closed valid analysis region.

13. The system according to claim 10, wherein the first plurality of different objects comprise a person or a vehicle.

14. The system according to claim 10, wherein the learning module further comprises distinguishing objects obtained from analyzing the specific scene in different time intervals so as to obtain different valid analysis regions of the specific scene in said different time intervals, respectively.

15. The system according to claim 10, wherein the learning module further comprises distinguishing and respectively connecting the objects obtained from analyzing the specific scene in different levels of brightness so as to obtain different valid analysis regions of the specific scene in said different levels of brightness, respectively.

* * * * *